United States Patent
Kalveram

[19]

[11] Patent Number: 5,864,804
[45] Date of Patent: Jan. 26, 1999

[54] VOICE RECOGNITION SYSTEM

[75] Inventor: Hans Kalveram, Nürnberg, Germany

[73] Assignee: U.S. Philips Corporation, New York, N.Y.

[21] Appl. No.: 662,722

[22] Filed: Jun. 10, 1996

[30] Foreign Application Priority Data

Jun. 10, 1995 [DE] Germany .................. 195 21 258.4

[51] Int. Cl.[6] .............................. G10L 5/06; G10L 9/00; G10L 3/02
[52] U.S. Cl. .................. 704/233; 704/251; 704/226; 704/227
[58] Field of Search ................. 704/233, 251, 704/226, 227

[56] References Cited

U.S. PATENT DOCUMENTS

| | | | |
|---|---|---|---|
| 4,797,929 | 1/1989 | Gerson et al. | 704/251 |
| 5,416,887 | 5/1995 | Shimada | 704/233 |
| 5,539,859 | 7/1996 | Robbe | 704/233 |

FOREIGN PATENT DOCUMENTS

| | | |
|---|---|---|
| 0508547A2 | 4/1992 | European Pat. Off. . |
| 4427124A1 | 2/1996 | Germany . |

OTHER PUBLICATIONS

The Use of a one-stage dynamic programming algorithm for connected work recognition, Hemann Ney, IEEE, ASSP-32 (1984), pp. 263-271.

*Primary Examiner*—David R. Hudspeth
*Assistant Examiner*—Robert Louis Sax

[57] ABSTRACT

The invention relates to a voice recognition system which is robust to echoes and other background noise. An additional input signal describing a disturbance is evaluated such that during this additional recognition there is maximum suppression of information contained in the input signal. For this purpose, comparison vectors are formed which are continuously adapted to the instantaneous interference. The voice recognition system receives speech signals superimposed by noise signals. Additionally, a first spectral analysis unit produces first spectral values combined to first spectral vectors derived from disturbed speech signals. Estimates of the noise signals are also produced. A second spectral analysis unit produces second spectral values combined to second spectral vectors from the noise signal estimates. Reference vectors formed by reference spectral values to which reference vectors are assigned indices and which reference vectors respond to the spectrums of reference speech signals are stored in memory. Comparison vectors are produced and assigned to the indices from the reference vectors and the second spectral vectors, a continuous adaptation being effected of at least one of the comparison vectors to the second spectral vectors. Indices are then selected by comparing the comparison vectors with the first spectral vectors.

14 Claims, 2 Drawing Sheets

VOICE RECOGNITION SYSTEM

The invention relates to a voice or speech recognition system.

BACKGROUND OF THE INVENTION

The automatic recognition of spoken speech can be used for many applications. The voice recognition, however, is frequently affected by background noise signals which are superimposed on the received speech signals. This leads to an increased error rate for voice recognition. Background noise signals are generated, for example, by an interference source which is situated in the neighborhood of a device that comprises the voice recognition system.

Also line echoes may form such background noise signals if the voice recognition system is used in a telecommunication terminal that is coupled to a telephone network. German Patent Application P 44 27 124.7 has disclosed a communication arrangement which comprises means for generating speech announcements and for voice recognition. By the speech announcement and voice recognition means there is a communication with a remote subscriber. As a result of reflections of speech announcements during transmission to the remote subscriber, unwanted echoes are generated which affect the recognition of speech signals from the remote subscriber. A compensation for the echoes to reduce the error rate on voice or speech recognition is effected in the spectral range domain in that differences are formed between short-time spectral values of received signals of the telecommunication device and estimated short-time spectral values of the echoes. For estimating the short-time spectral values of the echoes, short-time spectral values of the send signals (speech announcements) of the telecommunication device are determined and subjected to an adaptive weighting. The spectral differences in which the influences of the echoes are suppressed, are evaluated by the voice recognition means.

SUMMARY OF THE INVENTION

It is an object of the invention to provide a voice recognition system which guarantees a minimum-error voice recognition.

The object is achieved in that there are provided means for receiving speech signals superimposed by noise signals, first spectral analysis means for producing first spectral values derived from the disturbed speech signals and combined to first spectral vectors, means for producing estimates of the noise signals, second spectral analysis means for producing second spectral values combined to second spectral vectors from the estimates of the noise signals, a memory unit for storing reference vectors formed by reference spectral values, to which reference vectors are assigned indices, and which reference vectors correspond to the spectrums of reference speech signals, means for producing comparison vectors assigned to the indices from the reference vectors and the second spectral vectors, a continuous adaptation being effected of at least one of the comparison vectors to the second spectral vectors, and means for selecting indices by comparing the comparison vectors with the first spectral vectors.

The estimates of the noise signals contain additional knowledge about the instantaneous noise signal. This instantaneous noise signal may be captured, for example, by an additional microphone in the neighborhood of a noise signal source that generates the noise signals, so as to have the noise signals available largely separate from the speech signals and to estimate them. If the noise signals represent echoes of audio signals known a priori (for example, stored speech announcements in telephone answering machines or reproduction of music in motor vehicles), the noise signals can be determined from the original audio signals that generate the echoes by an estimation of a transfer function. Due to the continuous adaptation of the comparison vectors derived from the reference vectors and the second spectral vectors (noise vectors), a minimum-error voice recognition is guaranteed in which the successively selected indices correspond to the speech signal waveform with speech signal pauses and thus represent the respective result of the voice recognition. The voice recognition system is preferably realized by a signal processor which performs the signal processing for the voice recognition system in a program-controlled manner.

The comparison is particularly made in such a way that there are distances between the first spectral vectors and the comparison vectors that represent the degree of similarity between the first spectral vectors and the comparison vectors, a slight distance corresponding to much similarity. Then, assuming that a plurality of comparison vectors are assigned to one index, the results of the voice recognition will be improved when predefinable weights are used for the comparison vectors. When the indices are selected, those indices are selected that lead to a minimization of the distance and particularly a minimization of the total distance. The reference vectors correspond to the spectrums of reference speech signals which are determined before the voice recognition system is taken into operation and are stored in the memory unit. With respect to the voice recognition, the voice recognition system having the characteristic features according to the invention shows a robust behavior to noise signals which are superimposed on the speech signals. Both background noise signals from the environment of the system and, more particularly, sustained echo signals arriving with a long delay and acting as noise signals, which echo signals may arise from reflections in a telephone network, are compensated for effectively.

The estimates of the noise signals can be derived, more particularly, from independently capturing the noise signals in the neighborhood of the associated noise signal source. For this purpose, a microphone is installed in the neighborhood of the noise signal source. As for echoes of speech signals or other audio signals, the structure of the echoes acting as noise signals is known a priori. This is used for forming the estimates of the noise signals. A combination of these two estimates is also possible.

Highly reliable voice recognition results are obtained with an embodiment of the invention in which at least one reference vector and one or more successive second spectral vectors are assigned to one index to form a corresponding number of comparison vectors for this index, and in which, for the comparison with the first spectral vectors, the individual comparison vectors are evaluated adding weights to the respective vector distance.

Advantageously, the voice recognition system is used for recognizing speech signals transmitted acoustically, which speech signals come from a near-end user of a device that contains the voice recognition system, the voice recognition system being used for controlling sub-functions of the device. The voice recognition system may particularly be used for controlling functions of a radio receiver in a motor vehicle or other devices of the motor vehicle, for example, a window winder. Particularly in line-bound telephone terminals, mobile telephones and telephone answering machines, the voice recognition system may also be used for recognizing speech signals transmitted by a telephone network and intended for controlling sub-functions of a telecommunication device. The two approaches i.e. the recognition of speech signals of a near-end and of a remote subscriber can be used separately and also in combination.

The voice recognition system may also be used for controlling a plurality of different devices. Also its use in dictation systems is advantageous.

BRIEF DESCRIPTION OF THE DRAWING

These and other aspects of the invention will be apparent from and elucidated with reference to the embodiments described hereinafter.

In the drawings.

DESCRIPTION OF THE PREFERRED EMBODIMENTS

Figure 1:
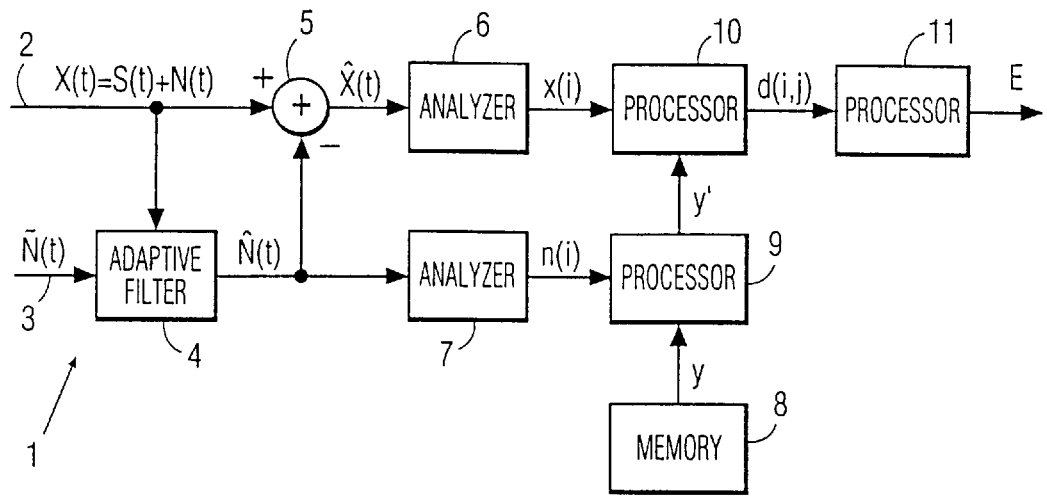
FIG. 1 shows a voice recognition system according to the invention.

The voice recognition system according to the invention shown in FIG. 1 comprises a receiving branch 2 for receiving disturbed speech signals $X(t)$ which are formed by the sum of undisturbed speech signals $S(t)$ and noise signals $N(t)$. Signals $\tilde{N}(t)$ representing the signals of a noise signal source and causing noise signals $N(t)$ to occur are fed to the voice recognition system 1 via a second receiving branch 3. The correlation between the noise signals $N(t)$ and the signals $\tilde{N}(t)$ is established by a transmission function which describes the transmission path from the noise signal source to the receiving means at the input of the receiving branch 2 which receiving means produce the disturbed speech signals $X(t)$.

For the case where a voice recognition system 1 is integrated with a telephone answering machine and the noise signals $N(t)$ represent line echoes occurring as a result of reflections of speech announcements in the telephone network when the telephone answering machine is remote-enquired, the signals $\tilde{N}(t)$ are determined and available via the speech announcements stored in the telephone answer machine. If the voice recognition system 1 is integrated with a device used in a motor vehicle, and if the noise signals $N(t)$ are considered to come from the driving noise, the signals $\tilde{N}(t)$ are obtained in that the driving noise is picked up by an additional microphone inside the motor vehicle, which microphone detects the background noise largely independently of the speech signals $S(t)$ to be recognized. The signals $\tilde{N}(t)$ may then also represent acoustic echoes of speech announcements sent to the user of the device, which speech announcements are intended to guide the user. A multichannel recording of signals $\tilde{N}(t)$, during which acoustic echoes and other background noise signals (for example, driving noise) are recorded separately, is then potentially advantageous.

An adaptive filter 4 which is adapted to said transfer function between the noise signal source and the receiving means of the receiving branch 2 forms noise signal estimates $\hat{N}(t)$ from the signals $\tilde{N}(t)$ which estimates are used as an approximation of the noise signals $N(t)$. The adaptive filter 4 is coupled to the receiving branch 2, so that in speech pauses in which the signals $X(t)$ comprise only noise signals $N(t)$, the adaptive filter 4 is set in accordance with said transfer function which then directly follows from the available signals $\tilde{N}(t)$ and $X(t)=N(t)$.

Subtracter means 5 subtract the noise signal estimates $\hat{N}(t)$ from the disturbed speech signals $X(t)$ and forms speech signal estimates $\hat{X}(t)=X(t)-\hat{N}(t)$ which approximate the speech signals $S(t)$. In this manner, the noise signals $N(t)$ contained in the signals $X(t)$ can already be partly compensated for.

A function block 6 combines a short-time spectral analysis to which the speech signal estimates $\hat{X}(t)$ are subjected. The time signals $\hat{X}(t)$ available as sample values are then subdivided into frames of constant lengths. Subsequently, the power density spectrum is calculated by means of a spectral transformation, for example, a Fourier transform. The thus produced spectral values are sub-sampled to reduce their number. In a particular embodiment the logarithmic values of the resulting spectral values are then subjected to a high-pass filtering. This is further described in EP 0 508 547 A3. The output is largely independent of both the amplitude-frequency characteristic and the volume of the disturbed speech signals $\hat{X}$ received on receiving branch 2. The function block 6 thus produces from the speech signal estimates $\hat{X}(t)$ first spectral vectors $x(i)$ with D components or spectral values $xd(i)$, where $d=1, 2, \ldots, D$, respectively. Then i denotes the frame of $\hat{X}(t)$ on which the short-time spectral analysis is based.

The noise signal estimates $\hat{N}(t)$ which represent time signals are applied to a function block 7 which performs a short-time spectral analysis just like function block 6 and produces second spectral vectors $n(i)$ with D components $nd(i)$ ($d=1, 2, \ldots D$). The voice recognition system 1 is preferably realized by a signal processor. The two spectral transformations combined by the function blocks 6 and 7 are then carried out consecutively.

Reference vectors $y(j,m)$ ($j=1, 2, \ldots$; $m=1, 2, \ldots M$), formed each by the short-time spectrum of a reference speech signal are stored in a memory 8. A speech pause is assigned to an additional index $j=0$. An associated reference vector is also stored in memory 8. A reference speech signal represents a word section described by the index j. M denotes the number of reference vectors or reference speech signals respectively, which are used for describing a single word section or a speech pause. There are various reference speech signals for a single word section if there are various types of speakers. There are various reference speech signals for a single speech pause if various types of noise signal sources are taken into consideration. If M exceeds 1, weights $g(j,m)$ indicate how well a respective comparison vector is suitable for describing the word section belonging to j or for describing the respective speech pause. The use of these weights will be further described below. For forming the reference vectors $y(j,m)$, the reference speech signals necessary for the respective voice recognition are recorded prior to taking the voice recognition system into operation and subjected to the short-time spectral analysis similarly to the processing by the function blocks 6 and 7. The spectral vectors resulting from an averaging are stored as reference vectors $y(j,m)$ in the memory unit 8.

Figure 2:
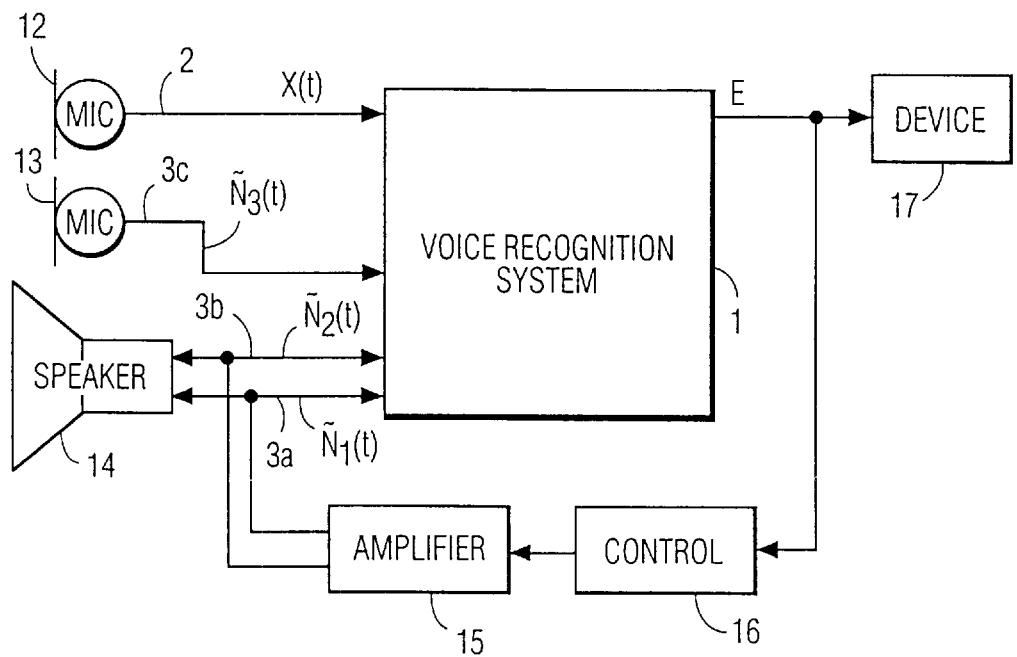
FIG. 2 shows an arrangement in which a device is extended by a dialogue-controlled user interface which comprises the voice recognition system according to the invention.

In FIG. 2, the voice recognition system 1 according to the invention forms part of a dialogue-controlled user interface for a device 17 in a motor vehicle. The device 17 is, for example, a mobile telephone, a traffic information system or a radio receiver. At least part of the functions of the device 17 are controlled by the voice recognition results E of the voice recognition system, for example, a voice recognition result E can trigger a target dialling when integrated with a mobile telephone. The receiving branch 2 of the voice recognition system 1 is connected to a microphone 12 directed at the user of the motor vehicle and is used for receiving his speech signals. The second receiving branch 3 comprises three receiving paths 3a, 3b and 3c. The stereo audio signals transmitted by an audio amplifier 15 to a loudspeaker arrangement 14 are applied as signals $\tilde{N}_1(t)$ and $\tilde{N}_2(t)$ in a multichannel version to the voice recognition system via the receiving paths 3a and 3b, which signals $\tilde{N}_1(t)$ and $\tilde{N}_2(t)$, once sent over the loudspeaker 14, have a disturbing effect on the received signals X(t) of the receiving branch 2 and are superimposed on the speech signals of the driver of the motor vehicle. Furthermore, an additional microphone 13 is arranged, which is used for capturing background noise and whose microphone signals are applied to the receiving path 3c as a signal $\tilde{N}_3(t)$. Since in this special case a plurality of different signals $\tilde{N}_1(t)$, $\tilde{N}_2(t)$ and $\tilde{N}_3(t)$ are received on three receiving paths 3a, 3b and 3c on the receiving branch 3, which correspond each to a signal from a noise signal source, the speech processing system as shown in FIG. 1 can in this respect be modified for a cost-effective processing of these signals in that the adaptive filter and the subtracter means 5 or the subtraction by the subtracter means 5 are omitted. The processing of the signals $\tilde{N}_1(t)$, $\tilde{N}_2(t)$ and $\tilde{N}_3(t)$ will be further explained below in the description of FIG. 4.

A dialogue control 16 generates voice responses as return messages to the driver of the motor vehicle in dependence on the results E of the voice recognition system 1 and also controls a muting circuit of the audio amplifier 15 when there is a dialogue with the driver of the motor vehicle.

For the further mode of operation of the voice recognition system according to FIG. 1 there are various embodiments. A first variant of an embodiment will be further explained with reference to FIG. 3.

Figure 3:
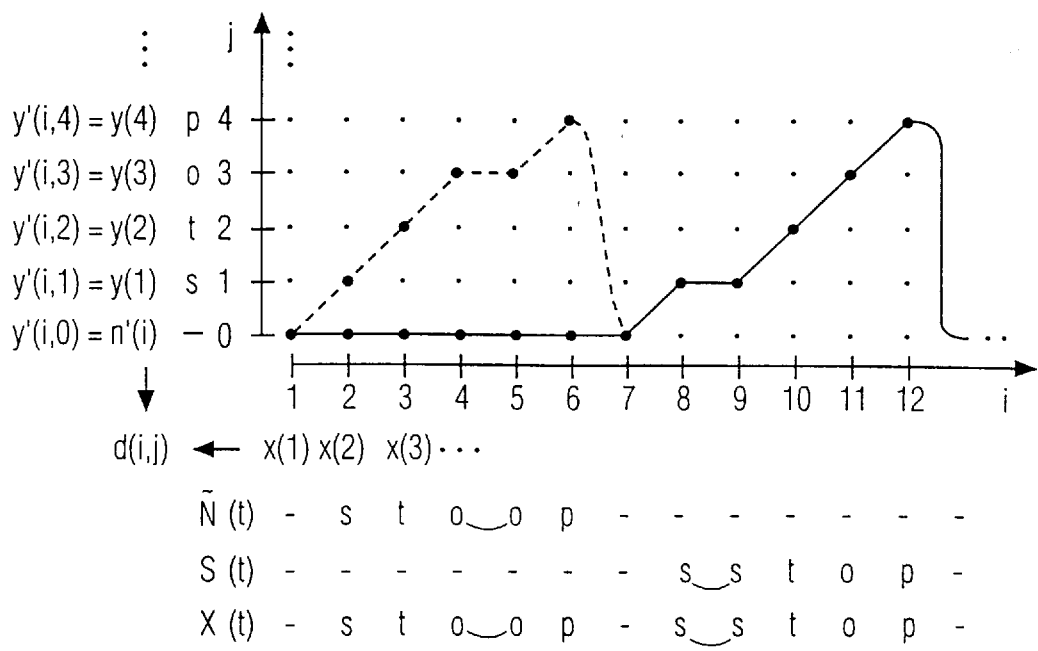
FIGS. 3 and 4 show timing diagrams of the voice recognition.

In this first variant of an embodiment, M is set to 1 i.e. exactly one reference vector y(j) is assigned to each index j. An index j plotted on the ordinate of the diagram shown in FIG. 3 is thus assigned exactly one reference vector y(j). The memory 8 transfers the reference vectors y(j) to the function block 9 which is used for forming the comparison vectors y'(i,j) from the reference vectors y(j) and the second spectral vectors n(i). To each index j is assigned at instant i a comparison vector y'(i,j). In the variant of the embodiment shown in FIG. 3 only the comparison vector y'(i,0) describing a speech pause is continuously adapted to the second spectral vectors n(i). The comparison vector y'(i,0) is computed via $$y'(i,0)=n'(i)=a.n(i)$$

where a represents a constant and predefinable factor by which the attenuation of the noise signal N(t) is described by subtracting the noise signal estimates $\hat{N}(t)$ with the subtracter means 5. The speech signal estimates $\hat{X}(t)$ compared with the noise signals X(t) contain noise signal portions attenuated by the factor a. The factor a adopts the value a=1 if the subtraction by the subtracter means 5 is omitted. Even with such an omission, the voice recognition system 1 can still operate. The subtraction by the subtracter means 5 certainly leads to improved voice recognition results. The factor a can be determined empirically and depends on the conditions of use of the speech processing system 1. When logarithmic spectral values are used, y'(i,0)=n'(i) is formed by adding ln(a) to the components of n(i). The following holds for all j>0:

$$y'(i,j)=y'(j)=y(j).$$

The comparison vectors y'(i,j) are thus time-independent i.e. independent of the time variables i and equal to the reference vectors y(j).

Distances d(i,j) are formed in a comparing unit 10 from the comparison vectors y'(i,j) produced by function block 9 and from the second spectral vectors x(i), in accordance with $$d(i,j) = \sum_{d=1}^{D} |xd(i) - yd'(i,j)|^p$$

xd(i) and yd'(i,j) represent the components of the first spectral vectors x(i) and of the comparison vectors y'(i,j). The value p is set equal to 1 in the present illustrative embodiment. A computation of the distance with p=2, however, is also possible. Distances are produced for all the indices j at each sampling instant i. They represent a value for the similarity between the first spectral vectors x(i) and the comparison vectors y'(i,j), which similarity between the vectors increases as the distance decreases. The first spectral vectors x(i) applied to the comparing unit 10 are assigned to the sampling instants i plotted on the abscissa of the diagram in FIG. 3.

The distances d(i,j) determined by the comparing unit 10 are evaluated by the function block 11. For each index j the associated distance is determined at each sampling instant i. The evaluation is particularly effected in accordance with the dynamic programming method (also called Viterbi algorithm) which is described, for example, in the article by H. Ney in IEEE Transactions on Acoustics, Speech and Signal Processing, ASSP-32 (1984), pages 263 to 271. There is a further possibility of evaluating the distances d(i,j) in that Hidden-Markov models are used in which the Viterbi algorithm or another optimization algorithm is applied. In the diagram j(i) shown in FIG. 3 the path is determined that leads to the smallest total distance.

In the illustrative embodiment shown in FIG. 3, the vocabulary of the voice recognition system 1 contains, for example, the word "stop" of which the sound is represented by the reference vectors y(1) to y(4). The speech recognizer forms part of a dialogue system which first issues the word "stop" as announcement $\tilde{N}(t)$. This announcement brings about an echo signal N(t) acting as a noise signal, which becomes part of the signal X(t) received along the receiving branch 2 (first "stop" in X(t)). In FIG. 3 the echo delay time is considered negligibly small. Then the word "stop" is spoken and recorded by the receiving branch 2 of the voice recognition system 1 as the speech signal S(t) to be recognized. The speech signal S(t) only forms part of the signal X(t) and not of the signal $\tilde{N}(t)$ which is generated independently of S(t). FIG. 3 visualizes variations of the speed of speech by repeating individual letters. The assignment shown of the word components (letters) to the spectral vectors x(i) is not mandatory. It is also possible to have longer or shorter word components described by respective spectral vectors x(i).

When the distances d(i,j) together forming a distance matrix are computed, the first spectral vectors x(i) generated by the function block 6 are compared with the comparison vectors y'(i,j), where y'(i,0)=n'(i) reflects the noise echo signal N(t). Therefore, there are extremely small distances for the index j=0 for the first word of the signal X(t), which corresponds to the interfering echo signal.

Since the interfering echo signal in this example is also included in the recognition vocabulary, it could be described by the sequence y(1), y(2), y(3), y(3), y(4), of reference vectors, or the sequence y'(i,1), y'(i,2), y'(i,3), y'(i,3), y'(i,4) of adapted comparison vectors, which is represented in FIG. 3 as a dashed path. Nevertheless, the path for the sampling instants i=1 to i=6 lies with index j=0, because in the dashed path a general representation of the word "stop" is compared with a specific articulation of this word, whereas for j=0 no such articulatory variation can impair the comparison and increase the distance values.

The second word of the signal X(t) which represents the speech signal S(t) i.e. the useful signal to be recognized, however, produces only small distances d(i,j) when compared with the sequence y(1), y(1), y(2), y(3), y(4), because the vector n'(i) in this range represents a speech pause.

In this manner the function block 11 provides the assignment path j(i) shown in FIG. 3, which path describes a speech pause during the echo (first "stop") in the signal X(t) and the recognized word while the word is actually being spoken (second "stop"). This assignment path j(i) corresponds to voice recognition result E produced by the function block 11.

Speech signals as noise signals N(t), as they occur, for example, as echoes in dialogue systems, are highly problematic for most voice recognition systems, because they, although attenuated, easily lead to erroneous insertions of words into the voice recognition result E coming from function block 11, that is, to an erroneous path j(i), if the useful signal S(t) is lacking. This is avoided with the voice recognition system according to the invention.

If the noise signal $\tilde{N}(t)$ and the useful signal (speech signal) S(t) occur simultaneously, it is not sufficient to replace only the reference vector y(0) that corresponds to a useful signal pause. It is rather a matter of replacing all the reference vectors y(j), which is not shown in FIG. 3.

The adapted comparison vectors can be formed according to the following formula $$y'(i,j)=y(j)+n'(i).$$

When logarithmic spectral values are used, the components of the adapted comparison vectors can be computed according to the formula $$yd'(i,j)=ln(exp(yd(j))+exp(nd'(i))).$$

To reduce the cost of computation, these components are approximated according to the formula $$yd'(i,j)=max(yd(j),nd'(i)).$$

These measures provide a modelling of masking of speech information, because the spectral value yd(j) stored for the index j and the frequency band d is replaced by the spectral value nd'(i) of the instantaneous noise signal when the latter value is higher. In this manner, instantaneously masking of parts of the speech information are taken into account for the noise signal $\tilde{N}(t)$ or N(t) when compared, and thus the recognition of a word is even made possible when individual sounds are fully immersed in background noise.

If high-pass filtered logarithmic spectral values are used as components of the reference vectors, the masking cannot be computed as described above by adding the powers together. The invention can be modified for this purpose, which will be explained below.

For the case where the noise signal power in the speech signal estimates $\hat{X}(t)$ compared with the power of the noise signal portion N(t) is not evenly attenuated in all the frequency bands by a constant factor a, the voice recognition system 1 is to be modified to obtain optimum voice recognition results. Especially if the adaptive filter 4 operating in the time range is omitted, n'(i) will not only depend on one spectral vector n(i), but on a plurality of spectral vectors n(i-r) with r=0, 1, . . . , R, depending on the duration of the impulse response belonging to the transfer function between the noise signal source and the receiving branch 2.

Bearing these considerations in mind, the invention is modified in this respect in that comparison vectors y'(i,j) are formed by the function block 9, so that at least one reference vector y(j,m) and, furthermore, one or more successive second spectral vectors n(i-r), are assigned to an index j at a sampling instant i. The associated illustrative embodiment shown in FIG. 4 comprises for each index j one reference vector y(j) and two successive second spectral vectors n(i−1) and n(i) as comparison vectors y'(i,j,m) with m=-R, . . . ,M=−1, 0, 1 (M=1, R=1).

The following holds y'(i,j,−1)=n(i−1).

y'(i,j,0)=n(i)

y'(i,j,1)=y(j)

Therefore, the spectral vector n(i−1) is buffered in function block 9. When weights g(i,j,m) with m=-R, . . . , M are used, there is taken into account whether the disturbance described by n(i) or n(i-r) respectively, can be expected to be mask by a reference word section that corresponds to the index j. This approach is based on the assumption that when two signals are to be added together at any instant, as a rule one signal largely masks the other and thus the spectral vectors essentially correspond to either of the two signals. For M>1 (i.e. various reference vectors are assigned to an index j), the respective weights g(i,j,m) describe whether in the respective case one reference vector is considered suitable or not for describing a speech signal compared with the other reference vectors that have the same index j.

With the time-dependent set of comparison vectors formed thus and fed to the comparing unit 10 by the function block 9, the distances to be determined by the comparing unit 10 are the result of $$d(i,j) = \min_{m = -R}^{M} \left\{ g(i,j,m) + \sum_{d=1}^{D} |xd(i) - yd'(i,j,m)|^p \right\}$$

$$= \min \left\{ \min_{m = 1}^{M} \left\{ g(i,j,m) + \sum_{d=1}^{D} |xd(i) - yd(j,m)|^p \right\}, \right.$$

$$\left\{ \min_{r = 0}^{R} \left\{ g(i,j,-r) + \sum_{d=1}^{D} |xd(i) - nd(i - r)|^p \right\} \right\}$$

General weights g(i,j,m) are considered here. As already described above, p can be set to 1, whereas p=2 is also possible. The more extensive computation of the distance requires only little additional work, because the additional terms can only depend on j due to the weights g(i,j-r) and the distances between x(i) and the interference vectors n(i) to n(i-N) need only to be computed once for each instant i. The additional terms are those terms where r shows up as a running variable.

When a distance d(i,j) is determined in accordance with the variant of the embodiment by the comparing unit 10, partial distances between the spectral vectors x(i) and these three vectors are added to the weights g(i,j,m) and, subsequently, the minimum is selected. In the present example the value 0 is stored as a weighting factor g(i,j,1) for all the time-invariant comparison vectors y'(i,j,1) that correspond to the reference vectors y(j) stored in memory 8. If no advance knowledge about the echo delay of the noise signal $\hat{N}(t)$ is presupposed, g(i,j,−1)=g(i,j,0) is a formulation that leads to good voice recognition results.

The weights g(i,j,m) are particularly to ensure that in the case of a pure noise signal (X(t)=N(t)), the state of pause j=0 is preferred. This is achieved if for j≧1 weighting factors with g(i,j,0)>g(i,0,0) are determined, which is shown in FIG. 4 by underlining of the respective comparison vectors n(i) or n(i−1).

For relatively large signal powers and positively recognizable sounds, for example vowels, the weights g(i,j,0) for j≧1, can be selected extremely large, because the recognition of the respective word is only considered if such a sound is not masked by the noise signal N(t). In this manner, the dependence of the weights g(i,j,m) on the index j describes whether a masking by the individual word sections or the noise signal N(t) is to be reckoned with, which specifically holds for the state of pause.

Figure 4:
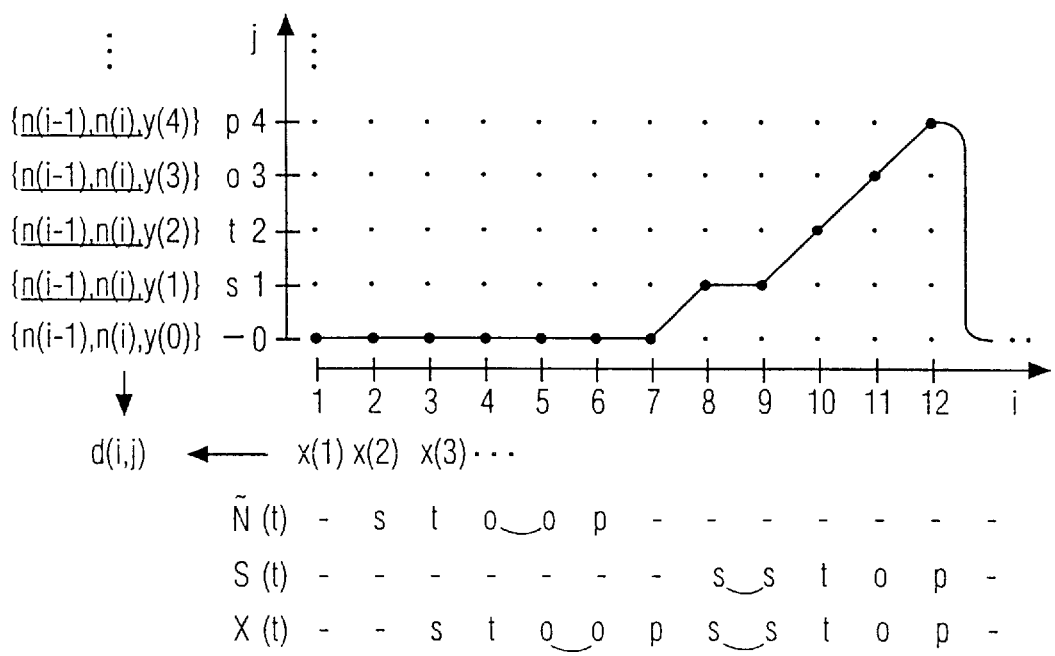

FIG. 4 is based on the same signals as used in FIG. 3. In FIG. 4 is taken into account a delay of the echo signal, that is, of the first "stop" in the signal X(t) compared with the signal N(t). An echo delay of about one sample interval is shown. Despite this echo delay, the voice recognition system 1 produces the correct voice recognition result E. The chance of omission-errors during voice recognition is very slim, because each individual spectral vector x(i) is additionally compared with only R+1 noise vectors (second spectral vectors), thus with a very brief section of the noise signal $\tilde{N}(t)$ or N(t), respectively.

If there are multichannel noise signals as shown in FIG. 2, the spectral analysis means of function block 7 directly process the signals $\tilde{N}_1(t)$, $\tilde{N}_2(t)$ and $\tilde{N}_3(t)$ as noise signal estimates in second spectral vectors $n_1(i)$, $n_2(i)$ and $n_3(i)$, while for a value of the time variables i, the function block 9 assigns to each of the indices j the set of three spectral vectors $n_1(i)$, $n_2(i)$ and $n_3(i)$ as a set of successive second spectral vectors (n(i−1) and n(i)) if the receiving branch 3 (cf. FIG. 4) comprises only a single receiving path. Also a combination of estimations so that both a plurality of receiving paths and a plurality of successive spectral vectors are taken into account for each index j, is an advantageous embodiment, in that case, for example, a set of second spectral vectors $n_1(i-1)$, $n_1(i)$, $n_2(i-1)$, $n_2(i)$, $n_3(i-1)$ and $n_3(i)$ is then assigned to the indices j for a value of the time variables i.

Particularly if there are long echo delays, the suppression of noise in the signal $\hat{X}(t)$ depends on the accuracy of the adaptive filter 4. These requirements are considerably reduced by the continuous adaptation of the comparison vectors in function block 9. In all the variants of embodiments presented here, the adaptive filter 4 may be omitted. The subtraction by the subtracter means 5 is not mandatory, as has been shown above.

With the voice recognition system 1 according to the invention it is possible to realize a reliable voice recognition for applications in which there is a speech control in the device, for example, when used in mobile telephones or radio receivers which are operated in motor vehicles, in telephone answering machines or automatic voice response systems which are communicated with via a telephone network.

In mobile telephones or radio receivers used in motor vehicles, acoustic echoes caused by speech announcements made to a user via an acoustic user interface may occur as noise signals. In radio receivers in motor vehicles, a recognition of speech signals of a user may also be disturbed by radio programs (for example, music). When telephone answer machines with a remote inquiry facility are used which can be controlled by speech signals, line echoes occur as noise signals, which line echoes are caused by reflections of announcements of the telephone answering machine when transmission to the user takes place. When automatic voice response systems are used, line echoes caused by speech announcements occur as noise signals just like in the telephone answering machines. The disturbing effect of such line echoes on the voice recognition of such devices is minimized by the voice recognition system according to the invention.

Furthermore, sub-functions of motor vehicles can be voice-controlled by means of the voice recognition system 1, for example, the control of a window winder. The voice recognition system according to the invention can also be used for lowering the error rate of voice recognition of dictation systems that convert speech directly into text.

Since an estimation of noise and useful signal portions is dispensed with in the described voice recognition system, decisions about the interpretation of individual time sections of each received signal as a useful or a noise signal are only made combined with the final recognition decision, the voice recognition system presents a very robust behavior with respect to noise signals.

There are only few additionally required computational circuitry for the voice recognition is small, so that the voice recognition system can be used both for expensive applications that have a large vocabulary of recognizable words and for applications that have an accordingly smaller size of vocabulary.

I claim:

1. A voice recognition system, comprising:

first spectral analysis means for receiving disturbed speech signals (X) composed of speech signals (S) superimposed by noise signals (N), and for producing first spectral vectors (x) comprising first spectral values (xd) from the disturbed speech signals (X);

means for producing estimates ($\hat{N}$) of the noise signals (N);

second spectral analysis means for producing second spectral vectors (n) comprising second spectral values (nd) from the noise signal estimates ($\hat{N}$);

a memory unit for storing reference vectors (y) comprising reference spectral values (yd), the reference vectors (y) being assigned indices (j), wherein the reference vectors (y) correspond to spectrums of reference speech signals;

means for producing comparison vectors (y') assigned to the indices (j) from the reference vectors (y) and the second spectral vectors (n), and for continuously adapting at least one of the comparison vectors (y') to the second spectral vectors (n); and means for selecting indices (j) by comparing the comparison vectors (y') with the first spectral vectors (x).

2. The voice recognition system as claimed in claim 1, wherein noise signals (N) are independently captured in the neighborhood of an associated noise signal source to form the estimates ($\hat{N}$) of the noise signals (N).

3. The voice recognition system as claimed in claim 1 wherein echoes of audio signals known a priori are copied to form the estimates ($\hat{N}$) of the noise signals (N).

4. The voice recognition system as claimed in claim 1, wherein an adaptive filter is used for filtering signals ($\tilde{N}$) of an associated noise signal source to form the estimates ($\hat{N}$) of the noise signals (N); and further comprising means for subtracting the estimates ($\hat{N}$) thus formed from the disturbed speech signals (X).

5. The voice recognition system as claimed in claim 1 wherein the comparison vector (y') corresponding to a speech signal pause (j=0) is continuously replaced by the present second spectral vector (n).

6. The voice recognition system as claimed in claim 1 wherein all the comparison vectors (y') are adapted to the present second spectral vector (n).

7. The voice recognition system as claimed in claim 1 wherein one index (j) is assigned at least a reference vector (y) and one or various successive second spectral vectors (n(i), n(i−1), ... ) to form a respective number of comparison vectors (y') for this index (j); and for a comparison with the first spectral vectors (x), the individual comparison vectors (y') are weighted by adding weights (g) to the respective vector distance.

8. The voice recognition system as claimed in claim 1, wherein said voice recognition system recognizes speech signals of a near-end user transmitted along an acoustic path to a telecommunication device and controls sub-functions of the telecommunication device in accordance with the recognized speech signals.

9. The voice recognition system as claimed in claim 1, wherein said voice recognition system recognizes speech signals transmitted by a telephone network to a telecommunication device and controls sub-functions of the telecommunication device.

10. The voice recognition system as claimed in claim 8 wherein a mobile telephone is used as the telecommunication device.

11. The voice recognition system as claimed in claim 8 wherein a telephone answering machine is used as the telecommunication device.

12. The voice recognition system as claimed in claim 1, wherein said voice recognition system controls sub-functions of a radio receiver of a motor vehicle.

13. The voice recognition system as claimed in claim 1, wherein said voice recognition system controls sub-functions of a motor vehicle.

14. An electric device comprising a voice recognition system as claimed in claims 1, wherein sub-functions of this device or of another electric device are controlled in dependence on recognized speech signals of the voice recognition system.

* * * * *